United States Patent Office 3,704,102
Patented Nov. 28, 1972

3,704,102
PRODUCTION OF CAUSTIC SODA PRILLS
Edward Merle Allen, Doylestown, Ohio, assignor to PPG Industries, Inc., Pittsburgh, Pa.
No Drawing. Continuation of abandoned application Ser. No. 757,750, Sept. 5, 1968. This application June 25, 1971, Ser. No. 156,924
Int. Cl. B01j 2/04
U.S. Cl. 23—302
8 Claims

ABSTRACT OF THE DISCLOSURE

Caustic soda prills are prepared by controllably cooling molten caustic soda droplets to a temperature below 260° C. but above about 122° C. with a moisture bearing gaseous coolant. Further cooling is then conducted in the absence of water vapor, e.g., by cooling in a moisture free gaseous environment.

RELATED APPLICATION

This application is a continuation of application Ser. No. 757,750, filed Sept. 5, 1968, now abandoned.

BACKGROUND OF THE INVENTION

Sodium hydroxide (caustic soda) is a common large tonnage chemical of commerce sold in various forms including solids. Substantial quantities of solid caustic soda are supplied as flake caustic, e.g., in the form of flakes. Flake products suffer from their tendency to be too friable and dusty. Also solid caustic is often used in conjunction with other solids which are not flake shaped. Flake caustic soda segregates from such solids.

U.S. Letters Patent 1,601,898 describes granular or globular caustic soda products which are characterized by coatings of inert inorganic substances designed to minimize the moisture absorbing qualities of caustic soda. Such products are prepared, according to the patent, by throwing a thin film of caustic soda into a strong blast of cold dry air in such a manner that the caustic soda is thrown upward and outward in the form of a spray or fountain. Special precautions are exercised to insure the coolant air is dry including the use of a drying tower of dehydrating material.

SUMMARY OF THE INVENTION

This invention deals with the provision of solid particulate caustic soda compositions. It more particularly concerns the manufacture of substantially anhydrous caustic soda prills by an especially economic and efficient method.

In accordance with this invention, caustic soda prills are provided by a procedure which includes cooling caustic soda droplets with a coolant gas and controlling the extent of such cooling to limit the reduction in the temperature of caustic soda to no lower than about 122° C., preferably no cooler than 127° C., but below about 260° C. By restricting the temperature to which the caustic soda droplets are cooled, it now has been found possible to employ moisture containing gaseous coolant, i.e., there is no need to rely upon dry (moisture free) gaseous coolant. This permits caustic soda prilling to be conducted using ambient or heated atmospheric air regardless of its moisture content thereby adding a new degree of processing freedom which affords considerable economic advantages as hereinafter will become more apparent.

After the caustic soda prills have been formed by limited cooling in the presence of water vapor (moisture) to an appropriate temperature above 122° C., any further cooling which is desired (as when the prills are to be bagged) must then be effected in a substantially anhydrous environment. Such cooling for the preparation of substantially anhydrous caustic soda prills which can be bagged entails reducing the temperature to 60° C. or cooler, but rarely below ambient temperature, e.g., about 20 or 25° C., prior to bagging. However, prilled product without this further cooling can be loaded directly into corrosion resistant containers, e.g., nickel-lined drums, or even loaded directed into a hopper car (under anhydrous conditions) for bulk shipment.

As used herein, the terms "essentially anhydrous" or "substantially anhydrous" defines conditions and/or caustic soda which are for all practical purposes free of water. In general, this caustic soda will contain less than about 2 percent water by weight of its NaOH content.

Although this invention is useful with respect to the preparation of various solid particulate caustic soda products by cooling of molten caustic soda, it is especially applicable to the preparation of essentially anhydrous caustic soda prills. It is suited admirably to the production of essentially anhydrous caustic soda prills having any of a wide range of diameter sizes, but notably in the range of 0.5 to 3.0 millimeters. Extremely uniform prill particle size compositions are attainable. The ensuing discussion will further amplify those conditions of prilling which can be varied to provide the prill compositions of any particular average diameter size.

An exemplary caustic soda prilled product which is effectively prepared by the method herein described is essentially pure, anhydrous caustic soda (NaOH) containing on the order of above 98 percent NaOH by weight. Minor amounts of moisture may be present, usually less than about 2 percent water, more notably well below that and in the range of between about 0.1 and 0.5 percent by weight of the NaOH content. Bulk densities of these prilled compositions are upwards of 65 pounds per cubic foot, and generally from 68 to 75 pounds per cubic foot, but rarely exceed 80 or 85 pounds per cubic foot. These prills are apt to contain a minor amount of sodium carbonate, typically less than about 1 percent by weight, to wit, in the range of 0.2 to 0.9 weight percent by virtue of their exposure, either during the prilling process or otherwise, to an environment containing carbon dioxide. Most of this carbonate content is apt to be as a thin layer (continuous or discontinuous) on the surface of the prill.

Although the procedure herein described is capable of preparing prills of diameters ranging between 0.5 and 3.0 millimeters, superior compositions are made up of prills between 1.0 and 2.0 millimeters diameter.

Such caustic soda prill compositions are prepared, according to a preferred embodiment of this invention, by initially providing molten caustic soda to a device located in the upper section of a prilling tower which is designed to discharge the caustic soda in the form of a small molten droplet. Many such devices are known to the art, and usually are referred to as prilling cups. Any of many such devices may be used.

In supplying molten caustic soda, into the prilling cup or like device, it is found advantageous to maintain the caustic soda fed to the cup at a temperature substantially above the normal melting point of anhydrous caustic soda. Thus, preferably molten caustic soda is fed to the prilling cup at a temperature some 5° C. or 10° C., or more above 318° C., the normal melting point of anhydrous caustic soda. This may actually involve heating the caustic to a somewhat higher temperature to account for cooling during its transport to the cup.

By feeding caustic soda at a temperature in the range of about 325° to 350° C. or possibly 360° C., problems of clogging in the prilling cup apertures are circumvented. In addition, at these temperatures, the caustic soda has adequate time to assume a more ideally spherical or globular configuration before cooling enough to lose the flowable characteristics it possesses in the liquid or molten state.

In this manner, substantially anhydrous molten caustic soda is metered in small controlled amounts out into the top of an appropriate cooling tower, typically referred to as a prilling tower. Thus, the prilling cup or like means is operated to discharge small controlled amounts of molten anhydrous caustic soda in the form of liquid droplets to the upper zone of a prilling tower or like cooling zone. Ideally, the prilling cup is designed so that it distributes these portions of caustic soda as uniformly as possible across the cross-sectional area of the prilling tower. These caustic soda droplets then descend by gravity to a lower portion of the prilling tower, falling at least 10, more usually 50 to 125 feet, but rarely more than 250 feet, although even higher towers are capable of operation. During this fall the caustic soda droplets cool (and under other appropriate conditions) collect in a lower zone in the form of solid prills or spherical particles.

In this prilling tower, the caustic soda droplets are cooled to below about 260° C. but no lower than about 122° C., usually no lower than 127° C. Gaseous coolant flowing upwardly from the lower to upper zones of the tower effects this cooling. Cooling sufficiently in this tower to form solidified caustic soda prills is necessary to the effective performance of this invention.

It is important to cool the molten caustic soda below 260° C., in the initial cooling step (e.g., before the caustic soda prills fall onto a solid surface such as the floor of the prilling tower) to insure that the solid caustic soda prills retain their prill configuration and individual identity. While still at temperatures above 260° C. they tend to adhere to one another or even splatter or otherwise disintegrate upon reaching the prilling tower floor.

Cooling in the prilling tower entails forwarding gaseous coolant upwardly and countercurrent to the falling caustic soda particles. A major advantage of the present invention is use of gaseous coolant which contains water vapor. Any gas which is substantially inert with respect to caustic soda under the conditions prevailing in the prilling tower (and also which, of course, is not especially corrosive to normal materials of construction employed in such prilling tower) can be used among which there may be mentioned argon, nitrogen, helium, and mixtures thereof, the most noteworthy being air. The usefulness of air indicates minor amounts of gases which are reactive with caustic soda are tolerable, e.g., carbon dioxide in the air.

So long as the caustic soda is not cooled to below about 122° C., the amount of water present as moisture or water vapr in the prilling tower is immaterial. Use of coolant gas, notably humid air, which contains significant amounts of water vapor, renders the process especially attractive. Atmospheric air, as a consequence, is the coolant in the preferred practices without particular concern for its relative humidity.

Besides its composition and water (moisture) content, the amount and temperature of the gaseous coolant introduced into the prilling tower is varied consistent with certain general principles. According to one embodiment, the gaseous coolant admitted to the tower, usually at the bottom to provide for countercurrent flow upwardly against downwardly falling caustic soda droplets is rarely below that minimum temperature to which the caustic soda is to be cooled. Preferably when it is first brought into contact with the caustic soda it is above about 122° C. to avoid overcooling the caustic. If the coolant is introduced into the tower at temperatures below 122° C. it is important to insure that despite being a temperature below 122° C., the gases do not cool the caustic to below 125° or 130° C. Moreover, it should be below about 260° C. when it first contacts caustic in the lower portion of the tower.

During its upward flow countercurrent to the caustic particles, the temperature of the gas increases as it picks up heat from the caustic. When removed from the upper zone of the prilling tower, the gas is normally some 40 to 100° C. above its inlet temperature. For example, with inlet air at a temperature of about 130° C., the exit air temperature is on the order of 170–230° C. with usual coolant feed rates.

The rate of gaseous coolant is variable consistent with obtaining the desired degree of cooling in the tower.

Caustic soda prills are collected in a lower portion of the tower, usually close to where coolant gas is introduced. It is preferable to remove these prills quite promptly, with the better practice providing for a substantially continuous removal.

After removal (and when they are apt to become cooler than 122° C.), the caustic prills are maintained and ultimately packaged under substantially anhydrous conditions. In one embodiment, a rake mechanism forwards the prills from the tower into a chamber sealed from the atmosphere into which water-free gaseous coolant (typically dehumidified air) reduces it to 60° C. or cooler. Such prill product may then be readily packaged for shipment.

The size of the holes or apertures in the prilling cup or like device is one primary determinant of the prill size, although the specific temperature of the caustic soda in the cup will have a bearing. Tower height (or length and time) of droplet (particle) fall also have a bearing.

The following examples illustrate the manner in which caustic soda prills are prepared in accordance with the invention herein described.

EXAMPLE I

Molten caustic soda at a temperature of 330° C. is fed at the rate of 8350 pounds per hour to a prilling cup located in the upper portion of a prilling tower some 29 feet in diameter and having an effective falling height (height from top of prilling cup to top of cooling air inlet) of about 65½ feet. The prilling cup is designed to provide prills of substantially uniform size by having all holes of equal diameter and varying the cup diameter to have the sum of centrifugal and hydrostatic forces at the holes constant at all cup levels.

Air obtained from the atmosphere containing water vapor is preheated to 130° C. and fed to the prilling tower about two feet above the floor at the rate of 19,200 actual cubic feet per minute. This air exits from the upper portion of the tower at 184° C.

Caustic soda prills of 1.1 millimeter diameter and at a temperature of 208° C. collect on the tower floor which they are promptly forwarded for further cooling to 60° C. in an essentially anhydrous atmosphere. These prills are then appropriately packaged.

In this manner approximately 100 tons per day of substantially anhydrous caustic soda prills with an average diameter of 1.1 millimeters are produced. Analytically they are essentially pure NaOH containing less than 0.5 percent water and about 0.9 percent $Na_2Co_3$ by weight.

Air exiting from the tower is returned to the bottom of the tower after it is cooled sufficiently. Cooling can be accomplished by mixing with an appropriate amount of atmospheric air.

EXAMPLE II

Using the apparatus and procedure described in Example I, substantially anhydrous caustic soda prills with an average diameter size of 1.5 millimeters are produced when 14,700 actual cubic feet of air per minute at 95° F. is fed to the column and removed at 192° F. The caustic soda prills which collect at the tower floor are at 211° C. To avoid the possibility of the prills cooling below about 130° C., the floor is heated to 130° C.

Although the examples show forwarding the prills from the prilling tower to a further structure when additional cooling is desired, additional cooling is not always necessary. Also, it is possible to conduct both the cooling in the presence and absence of moisture in a single tower divided into two zones, the lower one of which is operated under moisture free conditions.

While the invention has been described by reference to certain details of specific embodiments it is not intended that the invention be construed as limited thereto except as set forth in the appended claims.

I claim:

1. A method of producing essentially pure, substantially anhydrous, solid caustic soda spheres which comprises forming droplets of essentially anhydrous molten caustic soda from essentially anhydrous molten caustic soda, contacting the droplets with inert gaseous coolant containing water vapor and cooling the caustic soda droplets to below 260° C. but no lower than about 122° C. while the droplets are in contact with the water vapor containing a gaseous coolant, until said droplets solidify in the form of essentially pure, substantially anhydrous caustic soda spheres consisting essentially of said solidified droplets.

2. The method of claim 1 wherein the gaseous coolant is air containing water vapor.

3. The method of claim 1 wherein the solid spheres are thereafter further cooled under substantially anhydrous conditions to at least 60° C.

4. A method of producing essentially pure, substantially anhydrous, solid caustic soda prills which comprises feeding essentially anhydrous molten caustic soda at a temperature above the normal melting point of the anhydrous caustic soda to a prilling cup in an upper zone of a prilling tower, discharging from the cup into an upper zone of the tower small droplets of said essentially anhydrous caustic soda, allowing the caustic soda droplets to drop in the prilling tower, feeding inert gaseous coolant containing significant amounts of water vapor into a lower portion of the tower and providing therefrom an upwardly rising stream of inert gaseous coolant containing water vapor, cooling the caustic soda droplets by contact with this upwardly rising stream of inert gaseous coolant containing significant amounts of water vapor to below 260° C. but limiting the cooling to above 122° C. until said droplets solidify in the form of prills consisting essentially of the solidified anhydrous caustic soda droplets and collecting so-formed essentially pure, substantially anhydrous, solid caustic soda prills after they have cooled to below 260° C. but not below 122° C. on a solid surface in a lower portion of the tower.

5. The method of claim 4 wherein the gaseous coolant is air containing water vapor.

6. The method of claim 5 wherein coolant gas containing water vapor is removed from an upper portion of the tower, is cooled by mixing with atmospheric air and returned to the lower portion of the tower to provide the upwardly rising coolant gas stream containing water vapor in the tower.

7. The method of claim 4 wherein the caustic soda prills while still above 122° C. are removed from the tower, further cooled to at least 60° C. under substantially anhydrous conditions and then packaged.

8. A method of producing solid, essentially pure, substantially anhydrous caustic soda spheres which comprises heating substantially anhydrous caustic soda to render it molten, forming droplets of essentially anhydrous molten caustic soda from the molten caustic soda, and contacting the droplets with sufficient air containing water vapor to cool the droplets to above 127° C. but below 260° C. in the presence of water vapor, said cooling solidifying the droplets to form solid substantially anhydrous caustic soda spheres which consist essentially of the solidified droplets.

References Cited
UNITED STATES PATENTS 3,255,036  6/1966  Kramer et al. _____ 117—100

WILBUR L. BASCOMB, JR., Primary Examiner

S. SILVERBERG, Assistant Examiner

U.S. Cl. X.R.

264—14